(12) United States Patent
Blaise et al.

(10) Patent No.: US 11,993,032 B2
(45) Date of Patent: May 28, 2024

(54) MOLD FOR MANUFACTURING A TURBOMACHINE FAN CASING MADE OF A COMPOSITE MATERIAL WITH DIFFERENTIAL EXPANSION

(71) Applicant: SAFRAN AIRCRAFT ENGINES, Paris (FR)

(72) Inventors: Maxime Marie Désiré Blaise, Moissy-Cramayel (FR); Hubert Jean Marie Fabre, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 10 days.

(21) Appl. No.: 18/245,091

(22) PCT Filed: Sep. 6, 2021

(86) PCT No.: PCT/FR2021/051520
§ 371 (c)(1),
(2) Date: Mar. 13, 2023

(87) PCT Pub. No.: WO2022/058671
PCT Pub. Date: Mar. 24, 2022

(65) Prior Publication Data
US 2023/0286227 A1    Sep. 14, 2023

(30) Foreign Application Priority Data
Sep. 16, 2020 (FR) ........................ 2009366

(51) Int. Cl.
*B29C 70/48* (2006.01)
*B29C 33/48* (2006.01)
(Continued)

(52) U.S. Cl.
CPC .............. *B29C 70/48* (2013.01); *B29C 33/48* (2013.01); *B29C 45/14631* (2013.01);
(Continued)

(58) Field of Classification Search
CPC ..... B29C 33/302; B29C 33/304; B29C 33/48; B29C 33/485; B29C 33/76; B29C 70/462
See application file for complete search history.

(56) References Cited

U.S. PATENT DOCUMENTS 3,165,569 A * 1/1965 Bright ..................... B29C 43/00
264/327
5,597,435 A 1/1997 Desautels et al.
(Continued)

FOREIGN PATENT DOCUMENTS

FR  2 879 497 A1  6/2006
WO  WO 2018/234687 A1  12/2018

OTHER PUBLICATIONS

International Search Report as issued in International Patent Application No. PCT/FR2021/051520, dated Dec. 7, 2021.
(Continued)

*Primary Examiner* — Matthew J Daniels
(74) *Attorney, Agent, or Firm* — Pillsbury Winthrop Shaw Pittman LLP (57) ABSTRACT

A mould for manufacturing a turbomachine fan casing made of a composite material with fibrous reinforcement that is densified by a matrix, includes an impregnation mandrel around which a fibrous preform is to be wound and angular counter-mould sectors assembled around the external contour of the impregnation mandrel, which are intended to close the mould. The impregnation mandrel includes a main body with an annular shape, and an annular barrel which is arranged around the main body and around which the fibrous preform is to be wound, the barrel and the angular sectors defining a moulding cavity intended to receive the fibrous preform. The main body and the angular sectors are made of a first material having a first thermal expansion coefficient, the barrel being made of a second material that has a second
(Continued)

thermal expansion coefficient, the second thermal expansion coefficient being greater than the first thermal expansion coefficient.

9 Claims, 4 Drawing Sheets

(51) Int. Cl.
    *B29C 45/14*     (2006.01)
    *B29C 70/46*     (2006.01)
    *B29L 31/00*     (2006.01)
    *F01D 25/24*     (2006.01)

(52) U.S. Cl.
    CPC ...... *B29C 45/14786* (2013.01); *B29C 70/462* (2013.01); *B29C 2045/14286* (2013.01); *B29L 2031/7504* (2013.01); *F01D 25/24* (2013.01); *F05D 2230/20* (2013.01); *F05D 2300/603* (2013.01)

(56) References Cited

U.S. PATENT DOCUMENTS

| | | | | |
|---|---|---|---|---|
| 9,168,668 | B2* | 10/2015 | Mathon | B29C 70/32 |
| 9,193,101 | B2* | 11/2015 | Gummel | B29C 70/46 |
| 9,399,315 | B2* | 7/2016 | Plante | B29C 70/462 |
| 9,415,549 | B2* | 8/2016 | Mathon | B29C 33/30 |
| 9,533,454 | B2* | 1/2017 | Konigs | F01D 11/122 |
| 9,587,506 | B2* | 3/2017 | Konigs | B29C 70/86 |
| 9,833,930 | B2* | 12/2017 | Goering | F01D 21/045 |
| 11,186,014 | B2* | 11/2021 | Six | B29B 11/16 |
| 11,306,608 | B2* | 4/2022 | Marin | B29C 70/68 |
| 2010/0288429 | A1* | 11/2010 | Mathon | F01D 25/24 156/243 |
| 2014/0027046 | A1* | 1/2014 | Mathon | B29C 53/562 156/173 |
| 2014/0110063 | A1* | 4/2014 | Mathon | B32B 37/0046 156/580 |
| 2014/0150262 | A1* | 6/2014 | Le Borgne | B29C 70/088 29/889.3 |
| 2014/0202300 | A1* | 7/2014 | Mathon | B29C 70/545 156/353 |
| 2014/0239540 | A1* | 8/2014 | Plante | B29C 70/34 425/111 |
| 2014/0262046 | A1* | 9/2014 | Mathon | B29C 70/443 156/382 |
| 2014/0283977 | A1* | 9/2014 | Mathon | B29C 53/821 156/169 |
| 2014/0302186 | A1* | 10/2014 | Mathon | B29C 70/543 425/112 |
| 2015/0239181 | A1* | 8/2015 | Corradini | B65H 23/0328 156/64 |
| 2016/0075063 | A1* | 3/2016 | Hannecart | B29C 45/14065 415/200 |
| 2016/0076874 | A1* | 3/2016 | Corradini | G01B 11/026 242/443 |
| 2018/0169972 | A1* | 6/2018 | Mathon | F01D 25/24 |
| 2018/0370082 | A1* | 12/2018 | Mathon | B29C 70/32 |
| 2019/0030840 | A1* | 1/2019 | Camus | F02C 7/04 |
| 2019/0160765 | A1* | 5/2019 | Le Hong | B29C 70/462 |
| 2021/0379844 | A1* | 12/2021 | Fabre | B29C 70/462 |
| 2022/0402223 | A1* | 12/2022 | Guillot | B29C 33/302 |
| 2023/0122853 | A1* | 4/2023 | Fabre | B29C 70/48 264/241 |
| 2023/0140261 | A1* | 5/2023 | Fabre | B29C 33/301 264/219 |

OTHER PUBLICATIONS

Written Opinion of the International Searching Authority as issued in International Patent Application No. PCT/FR2021/051520, dated Dec. 7, 2021.

* cited by examiner

MOLD FOR MANUFACTURING A TURBOMACHINE FAN CASING MADE OF A COMPOSITE MATERIAL WITH DIFFERENTIAL EXPANSION

CROSS-REFERENCE TO RELATED APPLICATIONS

This application is the U.S. National Stage of PCT/FR2021/051520, filed Sep. 6, 2021, which in turn claims priority to French patent application number 20 09366 filed Sep. 16, 2020. The content of these applications are incorporated herein by reference in their entireties.

TECHNICAL FIELD

The present invention relates to the general field of manufacturing of turbomachine casings, and more particularly to casings for retaining gas turbine fans for aircraft engines.

PRIOR ART

A fan casing fulfils several functions in an aircraft turbomachine. The fan casing defines the air inlet duct of the turbomachine, supports an abradable material facing the tip of the fan blades, supports any sound absorption structure for acoustic treatment at the inlet of the turbomachine, and incorporates or supports a retention shield.

The retention shield forms a trap retaining debris, such as ingested objects or damaged blade fragments, projected under the effect of the centrifugal force, in order to avoid this debris passing through the casing and reaching other parts of the aircraft.

It is known to produce the fan casing from composite material, and more particularly from organic matrix composite material. In order to do this, a fibrous texture is wound around a mandrel in order to form a fibrous preform which has the shape of the casing to be manufactured. The fibrous preform is then densified by a matrix.

In order to perform the densification of the fibrous preform by the matrix, said fibrous preform is wound around an impregnation mandrel, then angular counter-mould sectors are arranged around the impregnation mandrel in order to form the injection mould. A precursor material of the matrix is then injected into the mould in order to densify the fibrous preform with said precursor material of the matrix. Once the fibrous preform is densified, the precursor material is polymerised.

In order to give the fibrous preform the thickness of the casing to be manufactured and to obtain the targeted fibre volume ratio, the angular counter-mould sectors are assembled on the impregnation mandrel so as to compress said fibrous preform against said impregnation mandrel around which said fibrous preform is wound.

However, such a compaction of the fibrous preform during the assembly of the angular counter-mould sectors on the impregnation mandrel may cause the appearance of defects, such as, for example, the pinching of fibres of the fibrous preform, buckling of fibres of the fibrous preform, or even local variations in the fibre volume ratio which may impact the local porosity of the fibrous preform with a view to its densification.

DISCLOSURE OF THE INVENTION

Therefore, the main object of the present invention is to provide a solution responding to the above-described problem.

According to a first aspect, the invention relates to a mould for manufacturing a turbomachine fan casing made of a composite material with fibrous reinforcement that is densified by a matrix that comprises:

an impregnation mandrel around which a fibrous preform is intended to be wound;

a plurality of angular counter-mould sectors assembled around the external contour of the impregnation mandrel, which are intended to close the mould;

characterised in that the impregnation mandrel comprises, on the one hand, a main body and, on the other hand, an annular barrel which is arranged around the main body and around which the fibrous preform is intended to be wound, the barrel and the angular sectors defining an impregnation cavity intended to receive the fibrous preform, the main body and the angular sectors being made of a first material that has a first thermal expansion coefficient, the barrel being made of a second material that has a second thermal expansion coefficient, the second thermal expansion coefficient being greater than the first thermal expansion coefficient.

Such a mould has the advantage of being able, when cold, to increase the size of the recess in which the fibrous preform is intended to be placed inside the mould. This makes it possible to reduce, or even do away with, the compression applied on the fibrous preform during the mounting of the angular sectors on the impregnation mandrel, while subsequently ensuring the compacting of the fibrous preform during heating of the mould. Indeed, the recess of the mould in which the fibrous preform is placed is defined between the angular sectors and the barrel. The barrel being made of a material having a coefficient of expansion greater than that of the angular sectors, it is possible to have, when cold, a size of recess that is sufficiently large to reduce, or even do away with, the compression force exerted on the fibrous preform and to ensure, when hot, its compacting through the expansion of the barrel.

In addition, by ensuring the compaction of the fibrous preform through the expansion of the barrel when hot, and no longer by tightening, when cold, of each angular so sector on the mandrel, a homogeneous compacting is produced without concentration of stresses.

According to a possible feature, the main body comprises a flange located at each of the axial ends of the main body, each flange comprising a conical surface which is suitable for cooperating with a complementary conical surface located at each of the axial ends of the barrel, the barrel being suitable for sliding along the conical surfaces of the flanges, through the difference in thermal expansion between the main body and the barrel.

According to a possible feature, an anti-friction coating is deposited on the conical surface of each flange, and/or on the conical surface of each axial end of the barrel.

According to a possible feature, a seal is located on the conical surface of each flange, or on the conical surface of each axial end of the barrel, or on the upper surface of the barrel.

According to a possible feature, the barrel is formed by a plurality of annular sections which are assembled together with a removable attachment.

According to a possible feature, the barrel is configured, on the one hand, to be in abutment against the radii of the main body and to be located at a distance from the angular sectors when the mould is at ambient temperature and, on the other hand, to be in abutment against the angular sectors and to be located at a distance from the radii of the main body when the mould is at a curing temperature of the matrix.

According to a possible feature, at least one hot positioning member is present on at least one angular sector, said at least one hot positioning member being configured to penetrate into a complementary hot positioning orifice present on the barrel when said barrel is in abutment against the angular sectors, or vice versa, namely that at least one hot positioning member is present on the barrel, said at least one hot positioning member being configured to penetrate into a complementary hot positioning orifice present on an angular sector when the angular sectors are in abutment against the barrel.

According to a possible feature, a cold positioning member is located on the radii of the main body, the cold positioning member being configured to penetrate into a complementary cold positioning recess or groove located on the barrel or on the radii when said barrel is in abutment against the radii of the main body (2a).

According to a second aspect, the invention relates to a method for manufacturing a turbomachine fan casing made of a composite material with fibrous reinforcement densified by a matrix with a mould according to the invention, comprising the following steps:
  winding a fibrous fan casing preform around the barrel of the impregnation mandrel;
  assembling the plurality of angular sectors on the external contour of the impregnation mandrel around which the fibrous preform is wound;
  heating the mould in order to compress the fibrous preform between the barrel and the angular sectors;
  injecting a precursor material of the matrix into the fibrous preform;
  polymerising the precursor material of the matrix.

According to a possible feature, the method comprises assembling the plurality of annular sections in order to form the barrel.

BRIEF DESCRIPTION OF THE FIGURES

Other features and advantages of the present invention will become apparent from the description given below, with reference to the appended drawings which illustrate an exemplary embodiment that is in no way limiting.

DESCRIPTION OF THE EMBODIMENTS

As shown in FIGS. 1 to 4, a mould 1 for manufacturing a fan casing of an aircraft turbomachine, made of a composite material with fibrous reinforcement densified by a matrix, comprises, on the one hand, an impregnation mandrel 2 that is annular along a main axis θ, and on the other hand a plurality of counter-mould angular sectors 3. The angular sectors 3 are removably attached on the exterior contour of the impregnation mandrel 2 in order to close the mould 1 and thus form a moulding cavity 4 in which a fibrous preform P is placed in order to be densified and thus form the fibrous reinforcement of the casing made of composite material.

The mould 1 is intended to be placed in an oven in order, in particular, to perform a polymerisation heat treatment of the precursor material of the matrix which has been injected into the fibrous preform P. According to an alternative embodiment, the mould can be equipped with its own heating means.

The impregnation mandrel 2 is formed, on the one hand, of a main body 2a which has an annular shape with main axis θ, and a barrel 2b which also has an annular shape with main axis θ. The barrel 2b is located around of the main body 2a of the impregnation mandrel 2. In addition, in order, in particular, to arrange the barrel 2b around the main body 2a, said main body 2a is formed by the assembly of radii 21a with main axis θ with two flanges 22a and 23a which are each located at an axial end of the radii 21a. The flanges 22a and 23a thus each form one axial end of the main body 2a. The flanges 22a and 23a are circular parts with axis θ. The flanges 22a and 23a are attached to the axial ends of the radii 21a by attachment elements 24a, for example an attachment by bolting. A cylindrical part or ferrule (not shown in FIGS. 1 to 4) can be interposed between the radii and the barrel.

In order to mount the barrel 2b around the main body 2a, the flanges 22a and 23a are separated from the radii 21a, and the barrel 2b is threaded around the radii 21a, the barrel 2b having an internal diameter greater than the external diameter of the radii 21a. Once the barrel 2b is installed around the radii 21a, the flanges 22a and 23a are each attached on an axial end of the radii 21a, said flanges 22a and 23a thus each forming an axial stop for the barrel 2b.

The barrel 2b participates with the angular sectors 3 in the formation of the moulding cavity 4 in which the fibrous preform P is installed, the fibrous preform P being wound around said barrel 2b. In addition, the shape of the exterior contour of the barrel 2b around which the fibrous preform P is wound is adjusted in order to give the desired shape to the casing, the choice of the barrel 2b placed around the main body 2a thus being adjusted according to the casing to be manufactured.

Figure 1:
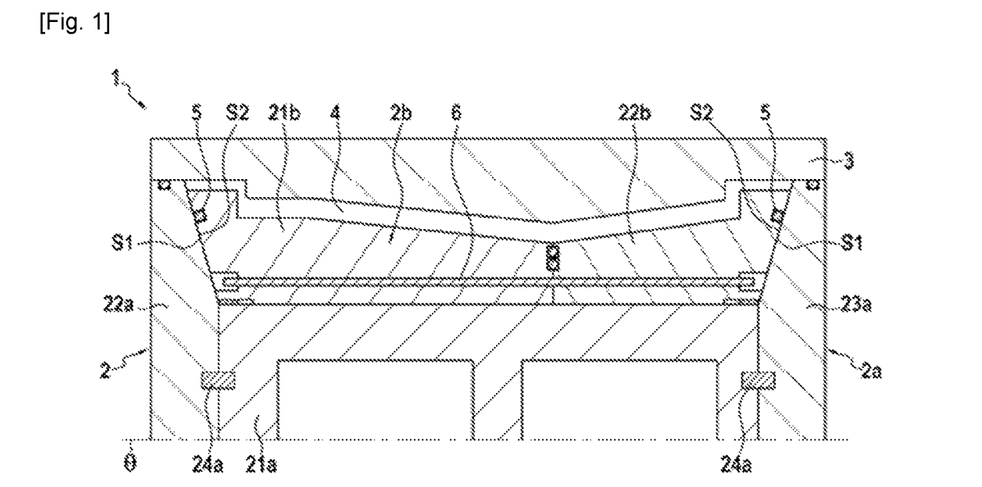
FIG. 1 schematically shows a half-sectional view of an empty mould, when cold, according to an embodiment.
Figure 2:
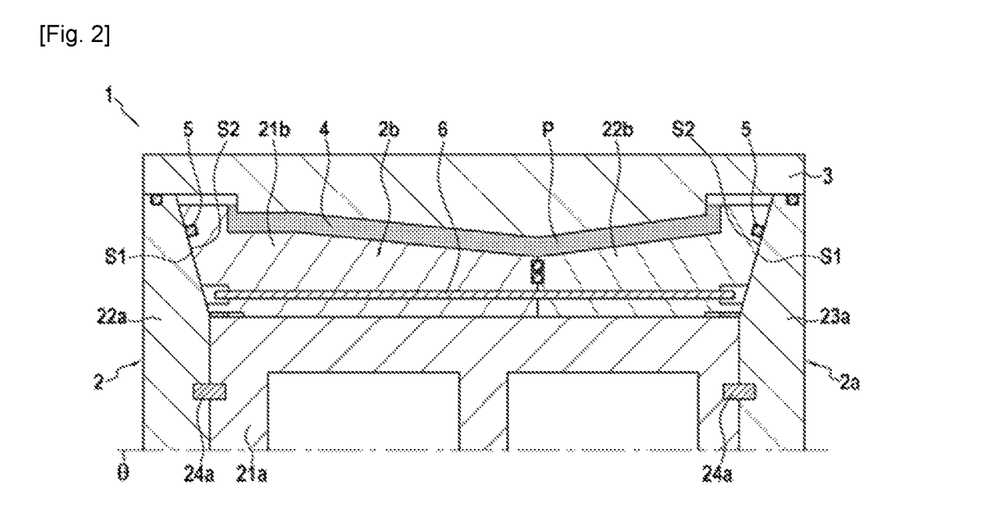
FIG. 2 schematically shows the mould of FIG. 1, inside which a fibrous preform is installed.
Figure 3:
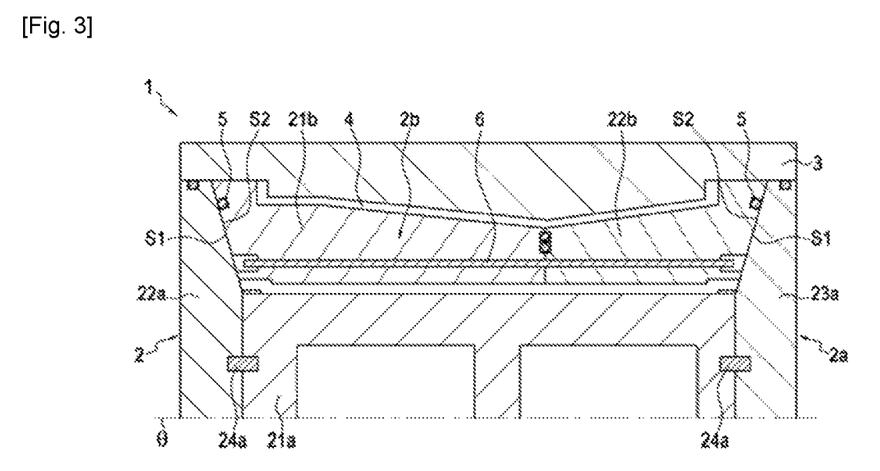
FIG. 3 schematically shows a half-sectional view of the mould of FIG. 1, when hot.
Figure 4:
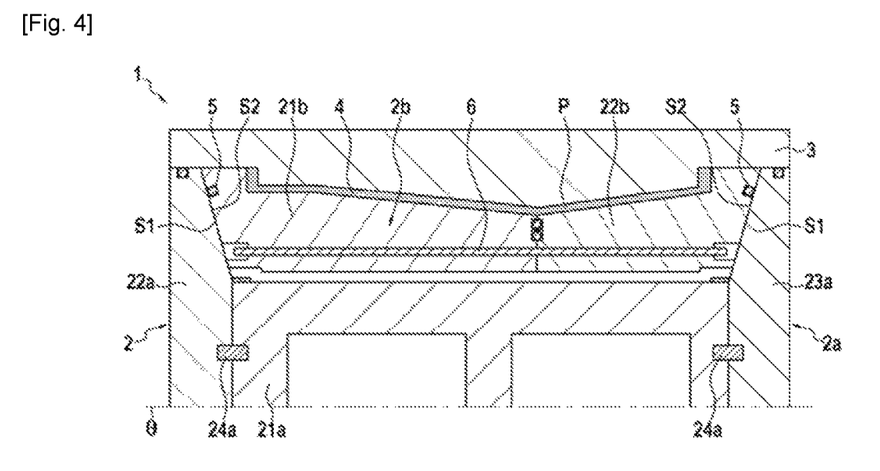
FIG. 4 schematically shows the mould of FIG. 2, when hot.

As can be seen in FIG. 2, the volume of the moulding cavity 4, and particularly the thickness of the moulding cavity 4, is larger when the mould 1 is cold, in other words at ambient temperature (20° C.), than when the mould 1 is hot, in other words at higher temperatures encountered during the steps for drying, injecting the liquid matrix precursor and curing the matrix of the composite material. This reduction in thickness of the moulding cavity 4 has the effect of compressing the fibrous preform P, thus allowing the casing to be given the desired thickness and allowing the desired fibre volume ratio to be obtained. The fibrous preform P is thus only compressed during the temperature rises of the mould 1. The fibrous preform P is thus no longer compressed by the installation of the counter-mould angular sectors 3 on the impregnation mandrel 2, thus avoiding the formation of defects caused by a non-uniform compression of the fibrous preform P, such as, for example, pinching of fibres or buckling of fibres.

This reduction in the volume of the moulding cavity 4 by heating, is obtained through a difference in thermal expansion between, on the one hand, the barrel 2b and, on the other, the main body 2a and the angular sectors 3, the barrel 2b expanding more under the effect of heat than the other elements of the mould 1. Under the effect of heat, for example the heat used for curing the matrix, the diameter of the barrel 2b will increase more than that of the angular sectors 3 which form the counter-mould, thus compressing the fibrous preform P between the barrel 2b and the angular sectors 3.

Such a difference in thermal expansion is obtained by using, on the one hand, a first material with a first coefficient of thermal expansion to form the main body 2a and the angular sectors 3 and, on the other hand, a second material with a second coefficient of thermal expansion to form the barrel 2b, the second coefficient of thermal expansion being greater than the first coefficient of thermal expansion.

According to a first possible non-limiting example of the invention, the first material is a steel with low coefficient of thermal expansion, having a coefficient of $10 \times 10^{-6}$ $K^{-1}$, and the second material is a steel with high coefficient of thermal expansion, having a coefficient of $15 \times 10^{-6}$ $K^{-1}$. Thus, with a difference in coefficient of thermal expansion of $5 \times 10^{-6}$ $K^{-1}$ between the first material and the second material, a difference in thickness of the moulding cavity 4 of 0.8 mm is obtained for the manufacture of a casing having a radius of approximately 1 metre.

According to a second possible non-limiting example of the invention, the first material is a standard steel with a coefficient of thermal expansion of $12 \times 10^{-6}$ $K^{-1}$, and the second material is aluminium with a coefficient of thermal expansion of $22 \times 10^{-6}$ $K^{-1}$. Thus, with a difference in coefficient of thermal expansion of $10 \times 10^{-6}$ $K^{-1}$ between the first material and the second material, a difference in thickness of the moulding cavity 4 of 1.6 mm is obtained for the manufacture of a casing having a radius of approximately 1 metre.

According to a third possible non-limiting example of the invention, the first material is invar with a coefficient of thermal expansion of $1.5 \times 10^{-6}$ $K^{-1}$, and the second material is aluminium with a coefficient of thermal expansion of $22 \times 10^{-6}$ $K^{-1}$. Thus, with a difference in coefficient of thermal expansion of $20 \times 10^{-6}$ $K^{-1}$ between the first material and the second material, a difference in thickness of the moulding cavity 4 of 3.2 mm is obtained for the manufacture of a casing having a radius of approximately 1 metre.

Moreover, the larger the radius of the casing to be manufactured, and therefore likewise the radius of the various elements of the mould 1, the larger will be the variation in thickness of the moulding cavity 4.

As can be seen in FIGS. 1 to 6, the barrel 2b is movable between a cold position in which the barrel 2b is, on the one hand, in abutment against the radii 21a and, on the other hand, located at a distance from the angular sectors 3, and a hot position in which the barrel 2b is, on the one hand, in abutment against the angular sectors 3 and, on the other hand, located at a distance from the radii 21a. The compression applied on the fibrous preform when the barrel 2b is in the cold position is very low, or even zero. The fibrous preform P is actually compressed when the barrel 2b is in the hot position.

According to a possible embodiment, in order to guide the increase in diameter of the barrel 2b during heating of the mould 1, the barrel 2b is caused to slide at each of its axial ends along a conical surface S1 formed on each of the flanges 22a and 23a. In order to do this, each of the axial ends of the barrel 2b comprises a conical surface S2 that is complementary to the conical surface S1 formed on the flanges 22a and 23a, each conical surface S1 being pressed against a complementary conical surface S2. The inclination of the conical surfaces S1 and S2 is adjusted to the thermal expansion of the barrel 2b, in particular to the increase in length of said barrel 2b.

In order to improve the sliding of the barrel 2b against the flanges 22a and 23a, an anti-friction coating can be deposited on the conical surface S1 of each flange 22a and 23a, or on the conical surface S2 of each axial end of the barrel 2b, or even on the conical surface S1 of each flange 22a, 23a and on the conical surface S2 of each axial end of the barrel 2b.

In order to improve the sealing of the moulding cavity 4, a seal 5 can be arranged on the conical surface S1 of each of the flanges 22a, 23a, or even on the conical surface S2 of each of the axial ends of the barrel 2b, or again even on the conical surface S1 of each of the flanges 22a, 23a and on the conical surface S2 of each of the axial ends of the barrel 2b. The seal 5 can, for example, be an O-ring which is installed in a groove formed in a conical surface S1 or a conical surface S2. According to an alternative embodiment, a seal can likewise be arranged on the apex of one of the ends of the barrel. In this case, the seal must be compatible with the expansion of this part of the mould.

Furthermore, as shown in FIGS. 1 to 4, the barrel 2b is formed by a plurality of annular sections 21b, 22b which are assembled together by their axial ends with a removable attachment. According to a possible example, the annular sections 21b, 22b are attached together by a plurality of through screws 6. In addition, seals can be arranged at the junctions between the annular sections 21b, 22b in order to improve the sealing of the barrel 2b. Other assembly configurations of barrel sections are of course possible.

Figure 5:
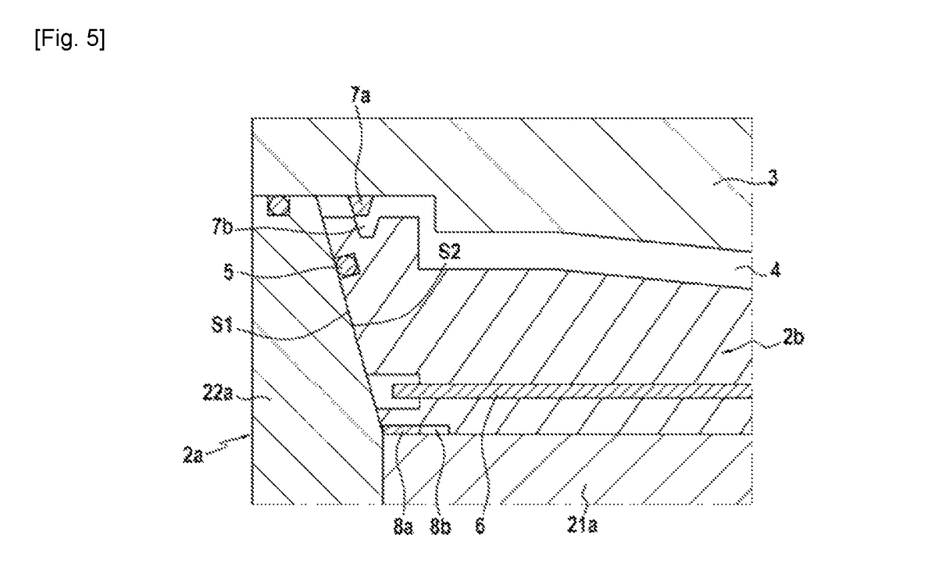
FIG. 5 schematically shows a view of a part of a cold mould provided with a hot positioning member according to an alternative embodiment of the mould of the invention.
Figure 6:
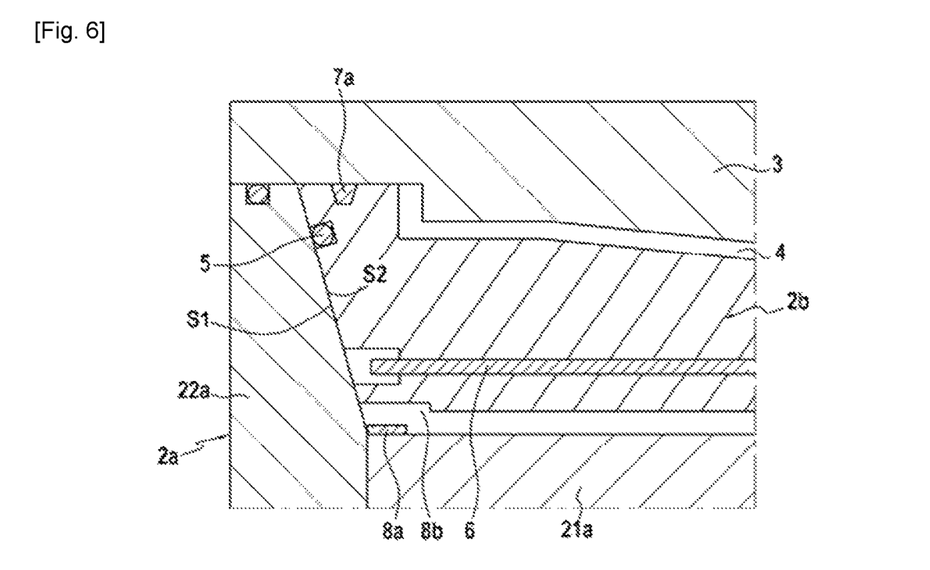
FIG. 6 schematically shows a view of the mould part of FIG. 5, when hot.

According to a possible embodiment illustrated in FIGS. 5 and 6, at least one hot positioning member 7a is located on at least one counter-mould angular sector 3, the hot positioning member 7a projecting into the moulding cavity 4. An angular sector 3 may comprise one or more hot positioning members 7a. This or these hot positioning members 7a are configured to each penetrate inside a hot positioning orifice 7b formed in the barrel 2b when the mould 1 is hot and thus the barrel 2b is in abutment against the angular sectors 3. The hot positioning member 7a can, for example, be a pin, or even a ridge. The hot positioning member 7a can have a conical section, the finest end being oriented towards the hot positioning orifice 7b. Conversely, at least one hot positioning member is present on the barrel, each hot positioning member being configured to penetrate into a complementary hot positioning orifice present on an angular sector when the angular sectors are in abutment against the barrel.

According to a possible embodiment, at least one cold positioning member 8a is located on the radii 21a, the cold positioning member member or members 8a being oriented towards the barrel 2b. This or these cold positioning members 8a are configured to each cooperate with a cold positioning recess or groove 8b formed in the barrel 2b when the mould 1 is cold and thus the barrel 2b is in abutment against the radii 21a. The cold positioning member 8a may have different shapes that are able to cooperate with the recess 8b. In the example described here, the cold positioning member consists of an annular part cooperating with a cold positioning groove 8b. Staying with the example described here, the groove 8b is wider than the member 8a and opens onto the lateral part of the barrel. According to an alternative embodiment, the cold positioning recess or groove can have dimensions corresponding to those of the cold positioning member. In this case, the member and the cold positioning recess or groove also perform a centring function. In addition, according to yet another alternative embodiment, a member and recess/groove pair can be provided for each of the barrel sections.

Figure 7:
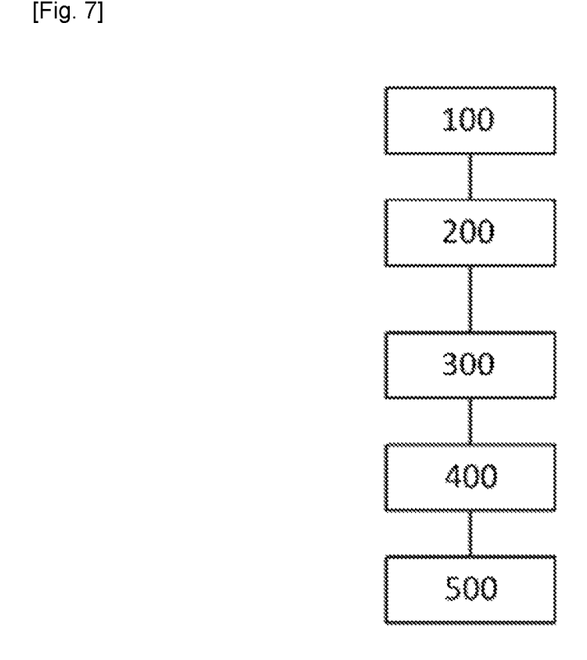
FIG. 7 schematically shows the steps of a method for manufacturing a casing made of composite material according to a possible implementation of the invention.

The mould 1 can be used by implementing the following steps:

100: winding the fibrous preform P around the barrel 2b of the impregnation mandrel 2;

200: assembling the plurality of angular sectors 3 on the external contour of the impregnation mandrel 2 around which the fibrous preform P is wound, the fibrous preform P being partially compressed or not compressed;

300: heating the mould 1 in order to compress the fibrous preform P between the barrel 2b and the angular sectors 3, the barrel passing from its cold position to its hot position under the effect of heat. The heating temperature can be, for example, between 100° C. and 300° C. This step can also optionally dry the preform;

400: injecting a precursor material of the matrix into the fibrous preform;

500: polymerising the precursor material of the matrix in order to form the casing by heating the precursor material of the matrix, the barrel 2b compressing the fibrous preform P under the effect of heat.

The fibrous preform P is mainly compacted during step 300 of heating the mould 1, then densified by injecting the precursor material of the matrix and by polymerising said precursor material. The final degree of compaction of the fibrous preform is reached during the last heating step of the mould, i.e. during the polymerisation.

The invention claimed is:

1. A mould for manufacturing a turbomachine fan casing made of a composite material with fibrous reinforcement that is densified by a matrix, which mould comprises:
    an impregnation mandrel around which a fibrous preform is intended to be wound;
    a plurality of angular counter-mould sectors assembled around the external contour of the impregnation mandrel, which are intended to close the mould;
    wherein the impregnation mandrel comprises a main body and an annular barrel which is arranged around the main body and around which the fibrous preform is intended to be wound, the annular barrel and the plurality of angular counter-mould sectors defining a moulding cavity intended to receive the fibrous preform,
    the main body and the plurality of angular counter-mould sectors being made of a first material that has a first thermal expansion coefficient, the annular barrel being made of a second material that has a second thermal expansion coefficient, the second thermal expansion coefficient being greater than the first thermal expansion coefficient,
    wherein the main body comprises a flange located at each of the axial ends of the main body, each flange comprising a conical surface which is adapted to cooperate with a complementary conical surface located at each of the axial ends of the barrel, the annular barrel being adapted to slide along the conical surfaces of the flanges through a difference in thermal expansion between the main body and the annular barrel.

2. The mould according to claim 1, wherein an anti-friction coating is deposited on the conical surface of each flange, or on the conical surface of each axial end of the annular barrel.

3. The mould according to claim 1, wherein a seal is located on the conical surface of each flange, or on the conical surface of each axial end of the annular barrel, or on an upper surface of the annular barrel.

4. The mould according to claim 1, wherein the annular barrel is formed by a plurality of annular sections which are assembled together with a removable attachment.

5. The mould according to claim 1, wherein the annular barrel is configured to be in abutment against radii of the main body and to be located at a distance from the plurality of angular counter-mould sectors when the mould is at ambient temperature and to be in abutment against the plurality of angular counter-mould sectors and to be located at a distance from the radii of the main body when the mould is at a temperature greater than or equal to 100° C.

6. The mould according to claim 5, wherein at least one hot positioning member is located on at least one angular counter-mould sector of the plurality of angular counter-mould sectors or on the annular barrel, said at least one hot positioning member being configured to penetrate into a complementary hot positioning orifice located on the annular barrel or on an angular counter-mould sector when said annular barrel is in abutment against the plurality of angular counter-mould sectors.

7. The mould according to claim 5, wherein a cold positioning member is located on the radii of the main body or on the annular barrel, the cold positioning member being configured to penetrate into a complementary cold positioning recess or groove located on the annular barrel or on the radii when said annular barrel is in abutment against the radii of the main body.

8. A method for manufacturing a turbomachine fan casing made of a composite material with fibrous reinforcement densified by a matrix with a mould that includes
    an impregnation mandrel around which a fibrous preform is intended to be wound;
    a plurality of angular counter-mould sectors assembled around the external contour of the impregnation mandrel, which are intended to close the mould;
    wherein the impregnation mandrel comprises a main body and an annular barrel which is arranged around the main body and around which the fibrous preform is intended to be wound, the annular barrel and the plurality of angular counter-mould sectors defining a moulding cavity intended to receive the fibrous preform, the main body and the plurality of angular counter-mould sectors being made of a first material that has a first thermal expansion coefficient, the annular barrel being made of a second material that has a second thermal expansion coefficient, the second thermal expansion coefficient being greater than the first thermal expansion coefficient,
    wherein the main body comprises a flange located at each of the axial ends of the main body, each flange comprising a conical surface which is adapted to cooperate with a complementary conical surface located at each of the axial ends of the barrel, the annular barrel being adapted to slide along the conical surfaces of the flanges through a difference in thermal expansion between the main body and the annular barrel,
    the method comprising:
        winding a fibrous fan casing preform around the annular barrel of the impregnation mandrel;
        assembling the plurality of angular counter-mould sectors on the external contour of the impregnation mandrel around which the fibrous fan casing preform is wound;

heating the mould in order to compress the fibrous fan casing preform between the annular barrel and the plurality of angular counter-mould sectors, and injecting a precursor material of the matrix into the fibrous preform, and polymerising the precursor material of the matrix.

9. The method according to claim 8, further comprising assembling a plurality of annular sections of the annular barrel in order to form the annular barrel.

* * * * *